(12) United States Patent
Kim et al.

(10) Patent No.: US 11,973,553 B2
(45) Date of Patent: Apr. 30, 2024

(54) MILLIMETER WAVE MOBILE ROUTER

(71) Applicant: GCT RESEARCH, INC, Seoul (KR)

(72) Inventors: Jeong Min Kim, Seoul (KR); Hyungkoo Lee, Tustin, CA (US)

(73) Assignee: GCT RESEARCH, INC, Seoul (KR)

( * ) Notice: Subject to any disclaimer, the term of this patent is extended or adjusted under 35 U.S.C. 154(b) by 0 days.

(21) Appl. No.: 17/917,930

(22) PCT Filed: Jan. 12, 2021

(86) PCT No.: PCT/KR2021/000424
§ 371 (c)(1),
(2) Date: Oct. 8, 2022

(87) PCT Pub. No.: WO2021/206273
PCT Pub. Date: Oct. 14, 2021

(65) Prior Publication Data
US 2023/0198589 A1    Jun. 22, 2023

(30) Foreign Application Priority Data

Apr. 9, 2020  (KR) .......................... 10-2020-0043228

(51) Int. Cl.
*H04B 7/06*    (2006.01)
*H04B 1/3827*    (2015.01)

(52) U.S. Cl.
CPC ......... *H04B 7/0617* (2013.01); *H04B 1/3827* (2013.01); *H04B 7/0691* (2013.01)

(58) Field of Classification Search
CPC .. H04B 7/0617; H04B 1/3827; H04B 7/0691; H04B 17/23; H04B 17/309; H01Q 3/08; H04W 40/02

(Continued)

(56) References Cited

U.S. PATENT DOCUMENTS

2005/0250543 A1    11/2005  Thermond
2018/0269957 A1*    9/2018  Graham, III ............. H04B 7/15
(Continued)

FOREIGN PATENT DOCUMENTS

JP    63-303523    12/1988
JP    H11-68680    3/1999
(Continued)

OTHER PUBLICATIONS

PCT International Search Report dated Apr. 15, 2021.

*Primary Examiner* — Fitwi Y Hailegiorgis

(57) ABSTRACT

Proposed is a mobile router for transmitting and receiving millimeter waves to and from a base station, the mobile router including a first member including an antenna array configured to transmit and receive the millimeter waves, a second member, and an angle adjustment part connecting the first member to the second member, wherein the angle adjustment part is formed such that the first member and the second member are adjusted at a predetermined angle so as to allow the antenna array to transmit and receive the millimeter waves at a specific angle. The first member including the antenna array is configured to be unfolded at a predetermined angle with respect to the second member in order to transmit and receive a 5G millimeter wave beam signal at a specific angle, and thus a user can optimally adjust the transmission/reception sensitivity of 5G millimeter waves.

11 Claims, 7 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2018/0342789 A1 | 11/2018 | Jiang et al. | |
| 2019/0068259 A1 | 2/2019 | Liu et al. | |
| 2019/0154439 A1* | 5/2019 | Binder | ................... G01B 11/26 |

FOREIGN PATENT DOCUMENTS

| | | |
|---|---|---|
| JP | 2019-508988 | 3/2019 |
| KR | 10-2004-0016023 | 2/2004 |
| KR | 10-1051546 | 7/2011 |
| KR | 10-2011-0130958 | 12/2011 |
| KR | 10-1985909 | 5/2019 |

* cited by examiner

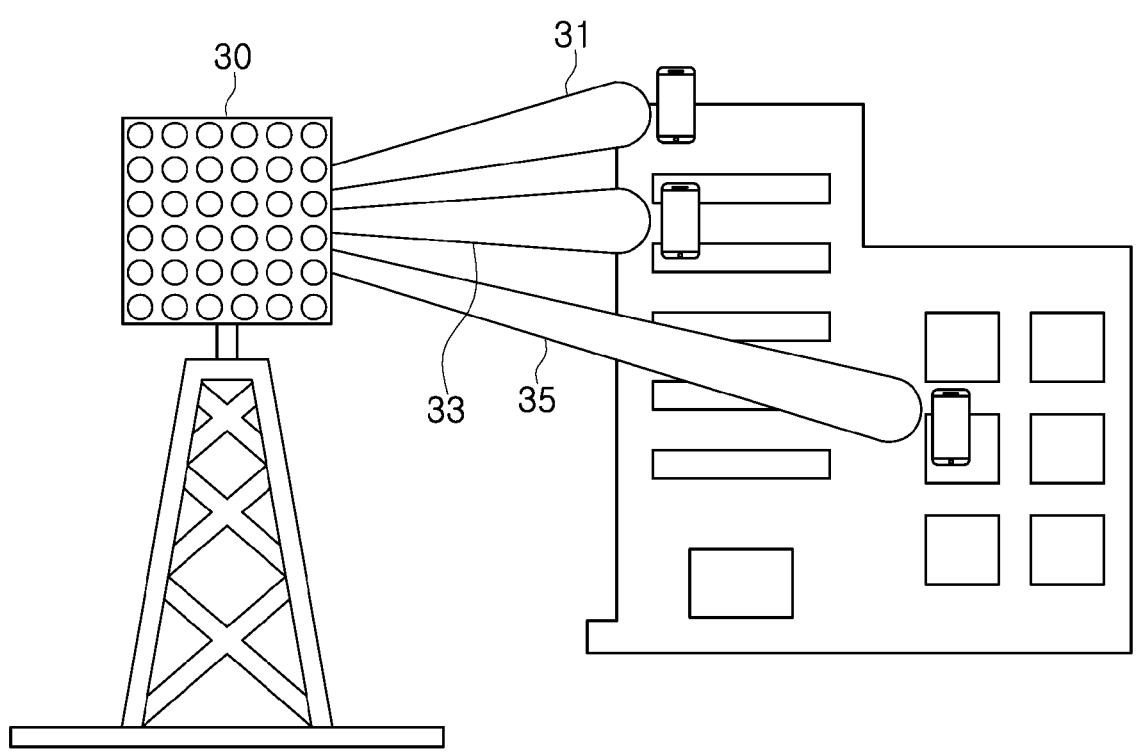
[Fig. 1]

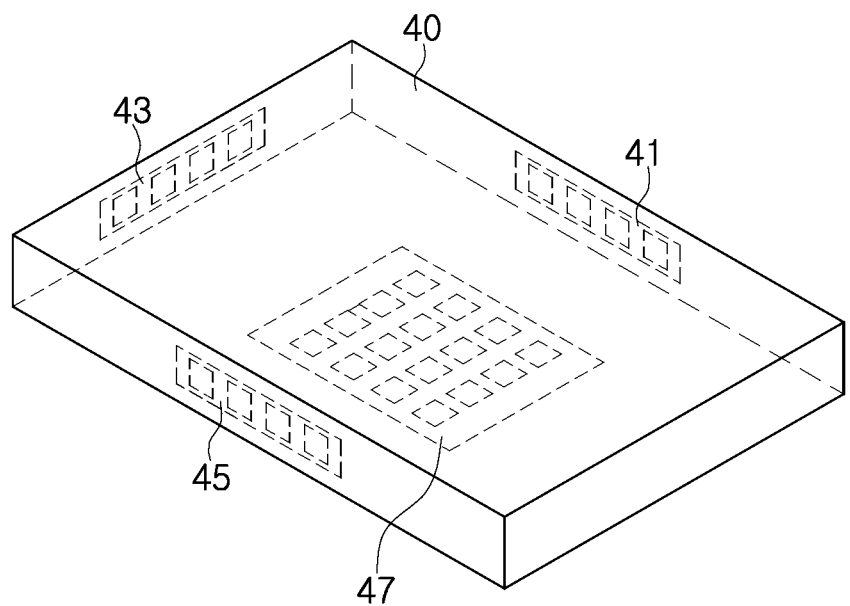

[Fig. 3A]
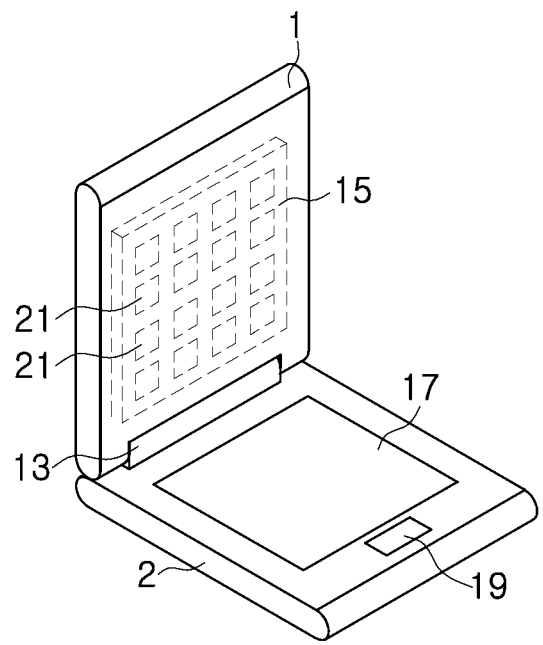
[Fig. 3B]
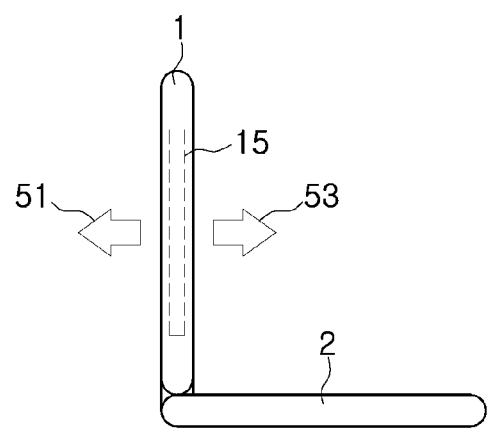

[Fig. 4A]
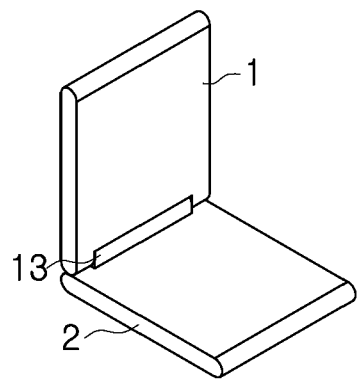
[Fig. 4B]
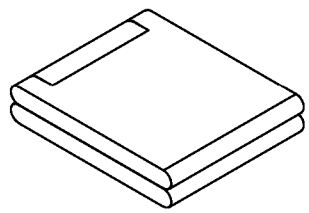
[Fig. 4C]
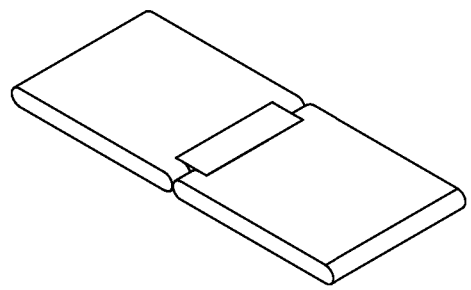

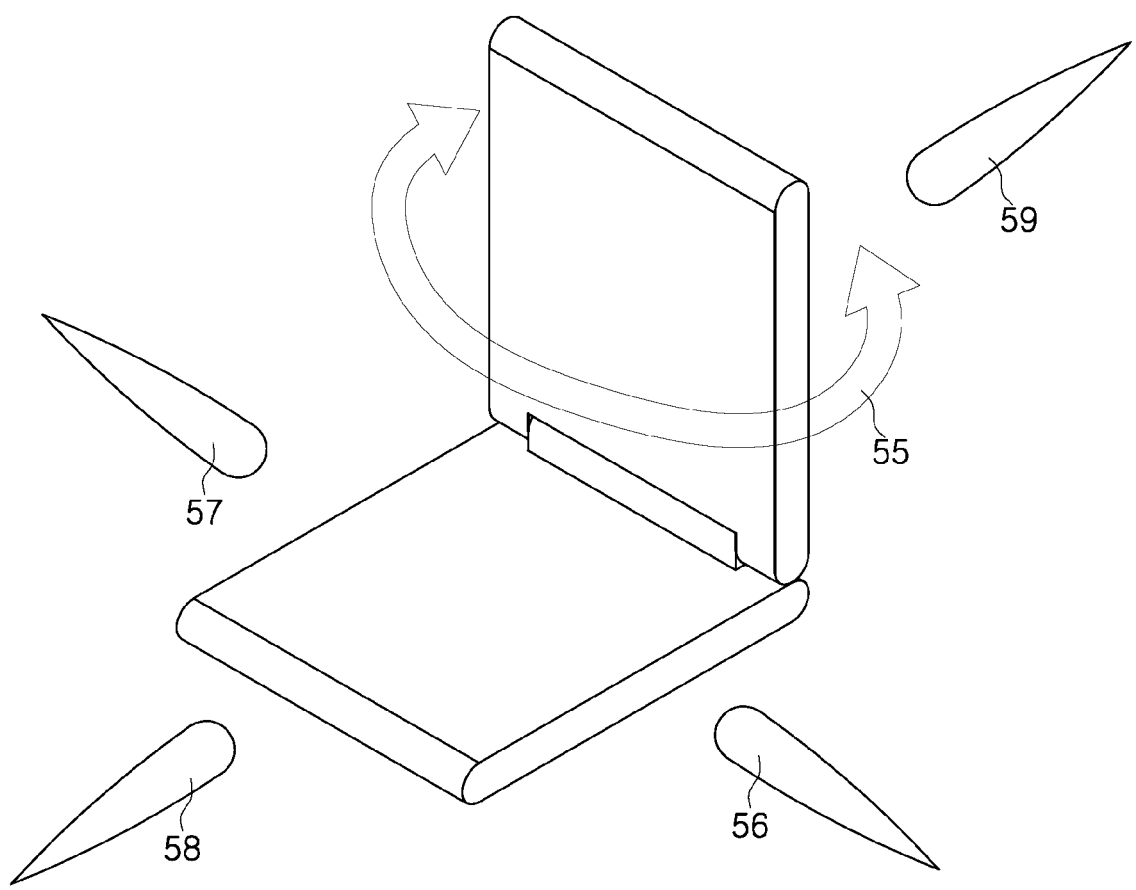
[Fig. 5]

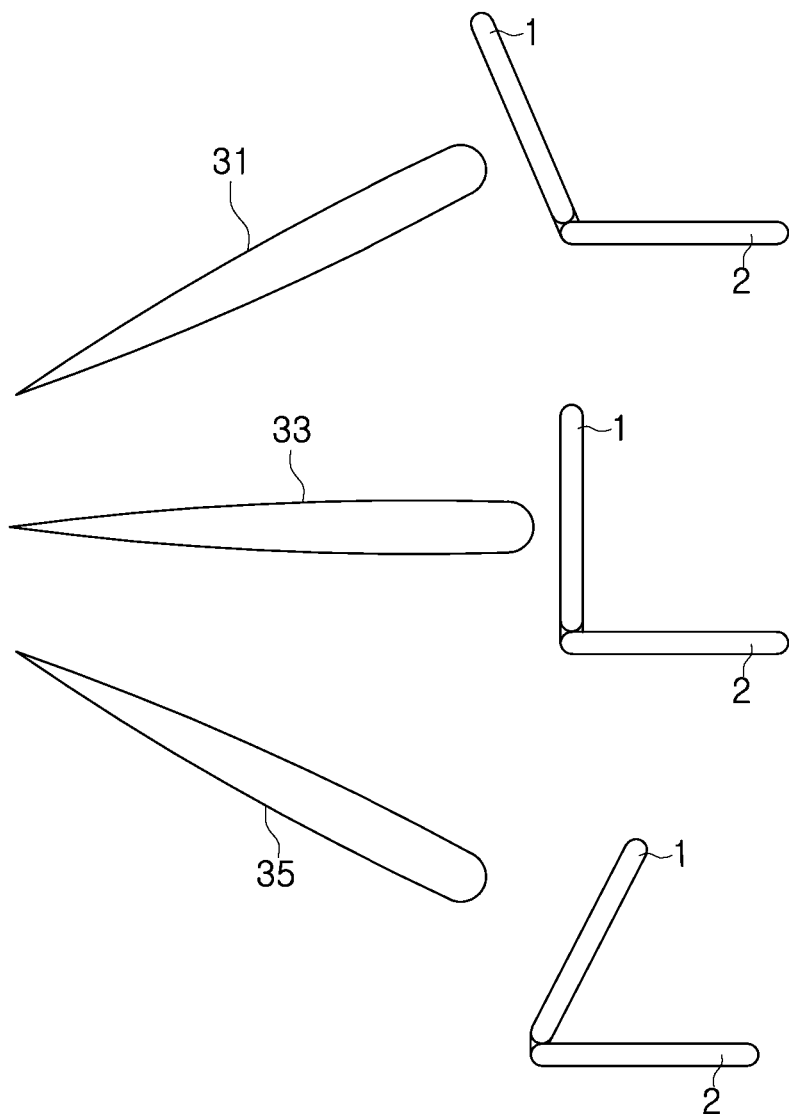
[Fig. 6]

[Fig. 7A]
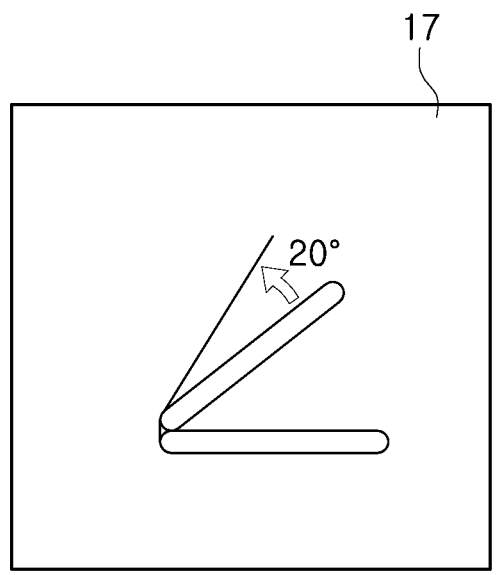
[Fig. 7B]
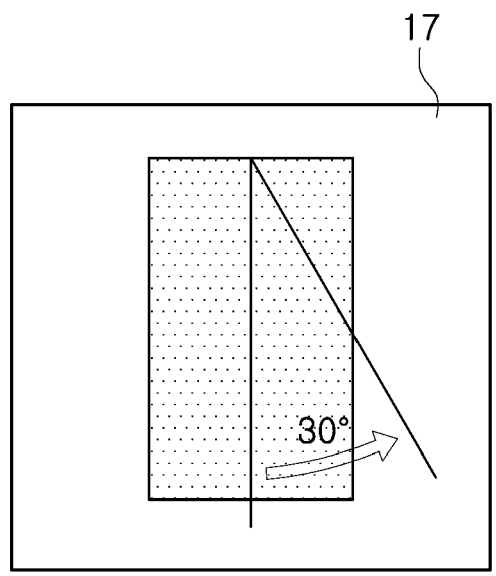

MILLIMETER WAVE MOBILE ROUTER

TECHNICAL FIELD

The present application claims priority to Korean Patent Application No. 10-2020-0043228, filed Apr. 9, 2020, the entire contents of which is incorporated herein for all purposes by this reference.

The present disclosure relates generally to a 5G mobile router and, more particularly, to a foldable mobile router capable of efficiently transmitting and receiving 5G millimeter waves with strong linearity.

BACKGROUND ART 5G mobile communication uses millimeter waves with a short wavelength of 1 to 10 mm and a frequency of 30 to 300 GHz. An advantage of the millimeter waves is that broadband transmission is possible due to their high frequencies, and a reduction in size and weight of antennas and transmission/reception devices is possible due to their short wavelengths. On the other hand, a disadvantage of the millimeter waves is that the waves cannot travel far and are easily blocked, so if a user puts his or her hand on an antenna of a smartphone, signals may be disturbed.

In an effort to compensate for the disadvantage of the millimeter waves, a base station uses an antenna array capable of beamforming to concentrate wireless energy to extend the transmission range and distance. Referring to FIG. 1, a 5G massive MIMO base station 30 using an antenna array and beam signals 31, 33, and 35 formed to have directionality by adjusting the phase of each antenna are illustrated. Portable terminals such as smartphones and mobile routers also need to transmit and receive 5G signals, so antenna arrays are used like the base station.

Although the transmission range and distance of the beam signals 31, 33, and 35 are extended due to their concentrated energy, this strong straightness causes a phenomenon in which reception sensitivity is significantly different depending on the direction and angle of a reception antenna of a terminal. Therefore, the closer the antenna array of the terminal receives beams in the vertical direction, the better the reception sensitivity. In general, as illustrated in FIG. 1, 5G signals are often received in a horizontal direction in which a second beam signal 33 travels, a horizontal-up direction in which a third beam signal 35 travels, a horizontal-down direction in which a first beam signal 31 travels, etc. with respect to the ground. In an embodiment, the horizontal direction refers to a direction parallel to the ground, and the horizontal-up direction refers to a direction away from the ground, and the horizontal-down direction refers to a direction toward the ground. For the convenience of description, three directions relative to the ground are referred to. The present invention is not limited thereto. In an embodiment, the reception antenna of a terminal may receive the 5G signals at four more directions with respect to the ground. In this case, the antenna array of the terminal is preferably disposed in a direction close to the vertical in order to receive the beam signals 31, 33, 35 in a direction close to the vertical.

A mobile router is a portable device acting as an access point (AP), a base station, or a hot spot that communicates with a mobile communication network to send and receive data and provides an access link to a mobile node located in its service radius. As illustrated in FIG. 2, a conventional 5G mobile router 40 is made thin for portability. When using the mobile router 40 by placing it in a predetermined place such as on a table, in order to vertically arrange a plurality of antenna arrays 41, 43, and 45 for optimal reception sensitivity, as illustrated in FIG. 2, each antenna array is inevitably formed narrow and long in a size of 1×4, 1×8, 2×4, 2×8, etc. on each narrow side surface of the mobile router 40. The use of such narrow and long antenna arrays has a limit in reception sensitivity and a limit in energy concentration of beams formed during transmission.

Furthermore, in order to optimally receive beam signals having various 'directions' and 'angles', as illustrated in FIG. 2, the conventional mobile router 40 has the narrow and long antenna arrays 41, 43, and 45 and selects one antenna with the best sensitivity among them to receive a signal. The mobile router 40 can be placed on the table to be oriented in a specific 'direction' in which the signal is received (e.g., east, west, south, north, etc.), but there is a problem in that it is difficult to receive beam signals received at various angles such as the horizontal direction, the horizontal-up direction, and the horizontal-down direction at an optimal 'angle'.

Meanwhile, when a wide antenna array 47 is disposed in the width direction of the mobile router (see FIG. 2), the reception sensitivity is improved and the energy concentration of the beams is also improved. However, when the mobile router is placed in the predetermined place such as on a table, it is optimized only for receiving a beam signal received in the vertical-up direction or vertical-down direction. This causes inconvenience in that the mobile router 40 has to be vertically erected in order to optimally receive a beam signal received in the horizontal direction.

Background art of the present disclosure is disclosed in Korean Patent Application Publication No. 10-2020-0008647.

DISCLOSURE

Technical Problem

Accordingly, the present disclosure has been made keeping in mind the above problems occurring in the related art, and an objective of the present disclosure is to provide a mobile router enabling a user to adjust an antenna array to be placed in an optimal direction and angle in order to optimize transmission/reception sensitivity of a 5G millimeter wave beam signal transmitted and received in various directions and angles.

Technical Solution

In order to accomplish the above objective, according to one aspect of the present disclosure a mobile router for transmitting and receiving millimeter waves to and from a base station, the mobile router includes a first member including an antenna array configured to transmit and receive the millimeter waves, a second member, and an angle adjustment part rotatably connecting the first member to the second member to unfold the first member and the second member at a first angle. The first angle is an angle between facing surfaces of the first and second members.

The angle adjustment part adjusts the first angle, and the antenna array of the first member is directed, in accordance with the first angle between the first and second members, to transmit and receive the millimeter waves travelling at a specific angle with respect to a ground.

The angle adjustment part rotates the first member and the second member relative to each other and the first and second members fold or unfold around a rotation axis of the angle adjustment part.

The angle adjustment part may be a hinge.

The antenna array may be formed to generate a directional millimeter wave beam by adjusting a phase of each antenna.

The mobile router may further include a sensitivity display part configured to display transmission/reception sensitivity of the millimeter waves according to a direction in which the first member is placed in a predetermined place and an angle at which the first member and the second member are unfolded.

The sensitivity display part may generate a sound.

The mobile router further includes an adjustment display part displaying a predetermined direction for the antenna array having increased transmission/reception sensitivity of the millimeter waves. The first angle is set according to the predetermined direction displayed on the adjustment display part.

The displayed predetermined direction may be generated on the basis of a phase of the millimeter waves received from the base station.

The mobile router includes an adjustment display part displaying a predetermined angle between the facing surfaces of the first and second members for the antenna array having increased transmission/reception sensitivity of the millimeter waves. The first angle is set according to the predetermined angle displayed on the adjustment display part.

The displayed predetermined angle may be generated on the basis of a phase of the millimeter waves received from the base station.

Advantageous Effects

As described above, according to the present disclosure, a first member having an antenna array is configured to be unfolded at a predetermined angle with respect to a second member in order to transmit and receive a 5G millimeter wave beam signal at a specific angle, so that a user can optimally adjust transmission/reception sensitivity of 5G millimeter waves.

Furthermore, an adjustment display part is additionally provided to display a predetermined direction to allow the user to place the mobile router in a specific direction or display a predetermined angle to allow the user to unfold the first and second members at a specific angle, so that the 5G millimeter wave beam signal can be received in an optimal direction and angle.

DESCRIPTION OF DRAWINGS

FIG. 1 is a view illustrating a 5G massive MIMO base station and beam signals.

FIG. 2 is a diagram showing the arrangement of an antenna array provided in a conventional mobile router.

FIGS. 3A, 3B, and 4A to 4C are block diagrams illustrating a mobile router according to an embodiment of the present disclosure.

FIG. 5 is a view illustrating that the mobile router according to the embodiment of the present disclosure receives beam signals in various directions.

FIG. 6 is a view illustrating that the mobile router according to the embodiment of the present disclosure receives beam signals at various angles.

FIGS. 7A and 7B are views illustrating an adjustment display part according to the embodiment of the present disclosure.

MODE FOR INVENTION

Hereinbelow, an exemplary embodiment of the present disclosure will be described in detail with reference to the accompanying drawings such that the present disclosure can be easily embodied by one of ordinary skill in the art to which this present disclosure belongs. Detailed descriptions of well-known functions and structures may be omitted to avoid obscuring the subject matter of the present disclosure. The embodiment of the present disclosure may be changed to a variety of embodiments and the scope and spirit of the present disclosure are not limited to the embodiment described hereinbelow.

All terms or words used herein should not be interpreted as being limited merely to common and dictionary meanings but should be interpreted as having meanings and concepts which are defined within the technical scope of the present disclosure.

In the description of various embodiments, the same names and the same reference numerals are used to refer to the same elements. In the figures, the size of elements or the thickness of lines may be exaggerated for clarity of illustration.

As used herein, the singular forms are intended to include the plural forms as well, unless the context clearly indicates otherwise. It will be further understood that the terms "comprise", "include", "have", etc. when used herein, specify the presence of stated features, integers, steps, operations, elements, components, and/or combinations thereof but do not preclude the presence or addition of one or more other features, integers, steps, operations, elements, components, and/or combinations thereof.

It is noted that components of the present disclosure are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

FIGS. 3A, 3B, and 4A to 4C are block diagrams illustrating a mobile router 10 according to an embodiment of the present disclosure.

Referring to FIGS. 3A and 3B, the mobile router 10 may include a first member 1, a second member 2, an antenna array 15, and an angle adjustment part 13, and may further include an adjustment display part 17, a sensitivity display part 19, a 4G antenna (not illustrated), etc. FIG. 3A is a perspective view of the mobile router 10, and FIG. 3B is a side view of the mobile router 10.

The first member 1 has the antenna array 15, and may be connected to the second member 2 through the angle adjustment part 13.

The angle adjustment part 13 may be formed such that the first member 1 and the second member 2 are adjusted at a predetermined angle so as to allow the antenna array 15 to transmit and receive millimeter waves to and from the base station 30 at a specific angle.

The first member 1 and the second member 2 may be unfolded or folded with the angle adjustment part 13 as an axis.

For example, referring to FIG. 4, the first member 1 and the second member 2 are vertically unfolded (see FIG. 4A), are fully folded (see FIG. 4B), and are fully unfolded (see FIG. 4C) with respect to the angle adjustment part 13 as an axis. In addition to this, it is preferable that the first member 1 and the second member 2 form various angles.

The angle adjustment part 13 may be a hinge, but is not necessarily limited thereto.

The antenna array 15 may be configured by arranging a plurality of patch antennas 21 in a flat matrix.

The antenna array 15 may be formed in the width direction of the first member 1.

The patch antennas 21 may have various shapes such as a rectangle, a circle, or an oval.

The antenna array 15 composed of an array of the patch antennas 21 may generate a directional millimeter wave beam with high directionality and high gain, and may generate a beam signal to have a specific directionality by adjusting the phase of each of the patch antennas 21.

As illustrated in FIG. 3B of the mobile router 10, the antenna array 15 may transmit and receive a beam with a directionality 51 or 53.

The mobile router 10 may further include the 4G antenna (not illustrated) in addition to the antenna array 15 for transmitting and receiving a 5G signal. A 4G signal may be received when the 5G signal is weak. This may be useful in places where signals are weak, such as a subway, or when a user moves with the mobile router 10 in a pocket. In particular, it may be very useful to use 4G when the first member 1 and the second member 2 are fully folded as shown in FIG. 4B.

Hereinafter, a description will be given of how the mobile router 10 according to the present disclosure receives a 5G millimeter wave beam signal transmitted and received in various 'directions' and 'angles' so that transmission/reception sensitivity is optimal.

FIG. 5 is a view illustrating that the mobile router 10 according to the embodiment of the present disclosure receives beam signals in various 'directions'.

As illustrated in FIG. 5, a 5G beam signal may be received in any direction, such as east, west, north, and south 56, 57, 58, and 59. Since the beam signal has high directionality, when the 5G beam signal is received in a specific direction, the mobile router 10 may be placed to be oriented in the specific direction. In other words, when the mobile router 10 is rotated in the direction of an arrow 55 illustrated in FIG. 5 so that the antenna array 15 of the mobile router 10 is oriented in a direction in which the 5G beam signal is received, optimal sensitivity may be achieved.

In this case, which direction the 5G beam signal is received may be identified through the sensitivity display part 19. The sensitivity display part 19 may be provided on the first member 1 or the second member 2.

The sensitivity display part 19 may display the transmission/reception sensitivity of the 5G signal (millimeter wave) according to a direction in which the mobile router 10 or the first member 1 is placed in a predetermined place, and may display the degree of the transmission/reception sensitivity through a display or sound.

Therefore, it is possible to find a direction to achieve optimal transmission/reception sensitivity using the sensitivity display part 19. For example, while the mobile router 10 is rotated in the direction of the arrow 55, the mobile router 10 may be continuously rotated in a direction in which the sound increases and then placed to be oriented in a direction in which the sound is the loudest, and in the case of the display, may be continuously rotated in a direction in which the sensitivity bar increases and then placed to be oriented in a direction in which the sensitivity bar is the largest. Alternatively, intermittent sounds may be generated so that the interval between the sounds is shortened in a direction in which the transmission/reception sensitivity is increased.

FIG. 6 is a view illustrating that the mobile router 10 according to the embodiment of the present disclosure receives beam signals at various 'angles'.

Even when a specific 'direction' (the direction in which the beam signal is received) with optimal sensitivity is found by the method described in FIG. 5, the reception sensitivity of a beam signal in the specific direction is different depending on various angles.

For example, in order to receive beam signals at various angles such as the second beam signal 33 travelling in the horizontal direction from the base station 30, the first beam signal 31 travelling in the horizontal-up direction from the base station 30, the third beam signal 35 travelling in the horizontal-down direction from the base station 30, etc. with optimal sensitivity, it is preferable to place a plane where the antenna array 15 is located in a direction as vertical as possible to the received beam signals. Of course, the direction may not necessarily be the vertical direction due to various circumstances and phases of signals.

Therefore, as illustrated in three examples illustrated in FIG. 6, the angle of the first member 1 and the second member 2 may be adjusted so that the first member 1 or the antenna array 15 receives the beam signals (received in the horizontal direction, the horizontal-up direction, the horizontal-down direction, etc.) in the vertical direction as much as possible to achieve optimal transmission/reception sensitivity.

In this case, in which direction the 5G beam signal is received may be identified through the sensitivity display part 19.

The sensitivity display part 19 may display the transmission/reception sensitivity of the 5G signal (millimeter wave) according to an angle at which the first member 1 and the second member 2 are unfolded, and may display the degree of the transmission/reception sensitivity through a display or sound.

Therefore, it is possible to find an angle to achieve optimal transmission/reception sensitivity using the sensitivity display part 19. For example, while the angle of the first member 1 and the second member 2 is adjusted, the first member 1 and the second member 2 may be continuously unfolded at an angle at which the sound increases and then finally unfolded at an angle at which the sound is the loudest, and in the case of the display, may be continuously unfolded at an angle at which a sensitivity bar increases and then finally unfolded at an angle at which the sensitivity bar is the largest. Alternatively, intermittent sounds may be generated so that the interval between the sounds is shortened at an angle at which the transmission/reception sensitivity is increased.

FIGS. 7A to 7B are views illustrating the adjustment display part 17 according to the embodiment of the present disclosure.

Referring to FIG. 7A, the adjustment display part 17 may display information enabling the user to adjust the 'angle' of the first member 1 and the second member 2. The adjustment display part 17 may be provided on the first member 1 or the second member 2.

A 'predetermined angle' at which the first member 1 and the second member 2 are unfolded at a specific angle in order to increase the transmission/reception sensitivity of a 5G beam signal (millimeter wave) may be displayed with an arrow or the like. For example, when unfolding the second member 2 by about 20 degrees more than a currently unfolded angle is necessary to achieve optimal transmission/ reception sensitivity, an arrow may be displayed to allow the user to further unfold the second member 2 by about 20 degrees.

In this case, at which angle the first member 1 and the second member 2 have to be unfolded for optimal sensitivity, that is, the angle displayed on the adjustment display part 17, may be calculated and generated on the basis of the phase of the millimeter waves received from the base station 30.

Furthermore, the adjustment display part 17 may display information enabling the user to place the first member 1 in a specific 'direction'.

A 'predetermined direction' in which the first member 1 is placed in the specific direction in order to increase the transmission/reception sensitivity of the 5G beam signal (millimeter wave) may be displayed with an arrow or the like. For example, when rotating the mobile router 10 counterclockwise by about 30 degrees with respect to a direction in which the mobile router 10 is currently placed is necessary to achieve optimal transmission/reception sensitivity, an arrow may be displayed to allow the user to further rotate the first member 1 by about 30 degrees.

In this case, in which direction the first member 1 has to be placed for optimal sensitivity, that is, the direction displayed on the adjustment display part 17, may be calculated and generated on the basis of the phase of the millimeter waves received from the base station 30.

As described above, according to the present embodiments, the first member 1 having the antenna array 15 is configured to be unfolded at a predetermined angle with respect to the second member 2 in order to transmit and receive the 5G millimeter wave beam signal at a specific angle, so that the user can optimally adjust the transmission/reception sensitivity of 5G millimeter waves.

Furthermore, the adjustment display part 17 is additionally provided to display a predetermined direction to allow the user to place the mobile router 10 in a specific direction or display a predetermined angle to allow the user to unfold the first and second members 1 and 2 at a specific angle, so that the 5G millimeter wave beam signal can be received in an optimal direction and angle.

Although a preferred embodiment of the present disclosure has been disclosed for illustrative purposes, those skilled in the art will appreciate that various modifications, additions, and substitutions are possible, without departing from the scope and spirit of the present disclosure. Therefore, the patent right of the present disclosure should be defined by the scope and spirit of the present disclosure as disclosed in the accompanying claims.

The invention claimed is:

1. A mobile router for transmitting and receiving millimeter waves to and from a base station, the mobile router comprising:

a first member including an antenna array configured to transmit and receive the millimeter waves;
a second member; and
an angle adjustment part rotatably connecting the first member to the second member to unfold the first member and the second member at a first angle,
wherein the first angle is an angle between facing surfaces of the first and second members.

2. The mobile router of claim 1,
wherein the angle adjustment part is configured to adjust the first angle, and
wherein the antenna array of the first member is directed, in accordance with the first angle between the first and second members, to transmit and receive the millimeter waves travelling at a specific angle with respect to a ground.

3. The mobile router of claim 1, wherein the angle adjustment part is configured to rotate the first member and the second member relative to each other, and the first and second members fold or unfold around a rotation axis of the angle adjustment part.

4. The mobile router of claim 1, wherein the angle adjustment part is a hinge.

5. The mobile router of claim 1, wherein the antenna array is formed to generate a directional millimeter wave beam by adjusting a phase of each antenna.

6. The mobile router of claim 1, further comprising a sensitivity display part configured to display transmission/reception sensitivity of the millimeter waves according to a direction in which the first member is placed in a predetermined place and an angle at which the first member and the second member are unfolded.

7. The mobile router of claim 6, wherein the sensitivity display part generates a sound.

8. The mobile router of claim 1, further comprising an adjustment display part configured to display a predetermined direction for the antenna array having increased transmission/reception sensitivity of the millimeter waves, wherein the first angle is set according to the predetermined direction displayed on the adjustment display part.

9. The mobile router of claim 8, wherein the displayed predetermined direction is generated on the basis of a phase of the millimeter waves received from the base station.

10. The mobile router of claim 1, further comprising an adjustment display part configured to display a predetermined angle between the facing surfaces of the first and second members for the antenna array having increased transmission/reception sensitivity of the millimeter waves, wherein the first angle is set according to the predetermined angle displayed on the adjustment display part.

11. The mobile router of claim 10, wherein the displayed predetermined angle is generated on the basis of a phase of the millimeter waves received from the base station.

* * * * *